United States Patent
Agrawal et al.

(10) Patent No.: US 6,691,098 B1
(45) Date of Patent: Feb. 10, 2004

(54) SYSTEM AND METHOD FOR EXPLAINING EXCEPTIONS IN DATA

(75) Inventors: Rakesh Agrawal, San Jose, CA (US); Sunita Sarawagi, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,263

(22) Filed: Feb. 8, 2000

(51) Int. Cl.[7] .................................................. G06F 17/30
(52) U.S. Cl. .......................................... 707/1; 707/104.1
(58) Field of Search .......................... 707/1, 7, 10, 100, 707/101, 104.1; 356/237; 705/2, 3; 704/1

(56) References Cited

U.S. PATENT DOCUMENTS

| | | | |
|---|---|---|---|
| 4,991,129 A | 2/1991 | Swartz | 364/707 |
| 5,321,833 A * | 6/1994 | Chang et al. | 707/5 |
| 5,367,702 A * | 11/1994 | Mahant-Shetti et al. | 708/606 |
| 5,544,138 A | 8/1996 | Bajorek et al. | 369/54 |
| 5,628,016 A | 5/1997 | Kukol | 395/704 |
| 5,652,891 A | 7/1997 | Kitamura et al. | 395/750 |
| 5,655,127 A | 8/1997 | Rabe et al. | 395/750.04 |
| 5,682,273 A | 10/1997 | Hetzler | 360/75 |
| 5,724,503 A | 3/1998 | Kleinman et al. | 395/185.1 |
| 5,825,482 A * | 10/1998 | Nikoonahad et al. | 356/237.2 |
| 5,977,987 A * | 11/1999 | Duluk, Jr. | 345/441 |
| 6,014,633 A * | 1/2000 | DeBusk et al. | 705/7 |
| 6,513,041 B2 * | 1/2003 | Tarin | 707/10 |
| 6,542,896 B1 * | 4/2003 | Gruenwald | 707/101 |
| 6,581,068 B1 * | 6/2003 | Bensoussan et al. | 707/104.1 |

\* cited by examiner

*Primary Examiner*—Charles Rones
(74) *Attorney, Agent, or Firm*—John L. Rogitz

(57) ABSTRACT

A system and method for explaining why an exceptional element in a multidimensional database is exceptional by presenting the element using at least two of the dimensions responsible for the exception. Maximal terms are identified in the monolithic equation that is used to identify exceptions, and based on the maximal terms the dimensions that are to be displayed are selected as a visual indication of why a displayed element is exceptional.

12 Claims, 4 Drawing Sheets

OVERALL LOGIC

OVERALL LOGIC

SELECTING MAXIMAL TERMS

| YEAR | 1998 |
|---|---|
| CATEGORY | Canned Oysters |

| Sum of SALE | MONYEAR | | | | | | | | | | |
|---|---|---|---|---|---|---|---|---|---|---|---|
| COUNTRY | 98/01 | 98/02 | 98/03 | 98/04 | 98/05 | 98/06 | 98/07 | 98/08 | 98/09 | 98/10 | |
| Canada |  | 24 | 22 | 18 | 25 | 15 | 61 | 32 | 65 | 52 | 5 |
| Mexico |  | 89 | 199 | 99 | 105 | 116 | 154 | 156 | 184 | 173 | 101 |
| USA |  | 172 | 121 | 207 | 125 | 100 | 172 | 81 | 129 | 191 | 210 |

— 52
— 54

| Sum of SALE | MONYEAR | | | | | | | | | | |
|---|---|---|---|---|---|---|---|---|---|---|---|
| COUNTRY | 98/01 | 98/02 | 98/03 | 98/04 | 98/05 | 98/06 | 98/07 | 98/08 | 98/09 | 98/10 | |
| Canada |  | 6% | 6% | 5% | 7% | 4% | 16% | 8% | 17% | 14% | 1% |
| Mexico |  | 6% | 13% | 7% | 7% | 8% | 10% | 11% | 12% | 12% | 7% |
| USA |  | 10% | 7% | 12% | 7% | 6% | 10% | 5% | 8% | 11% | 12% |

| YEAR | 1998 |
|---|---|
| COUNTRY | USA |

| Sum of SALE | MONYEAR | | | | | | | | | | |
|---|---|---|---|---|---|---|---|---|---|---|---|
| COUNTRY | 98/01 | 98/02 | 98/03 | 98/04 | 98/05 | 98/06 | 98/07 | 98/08 | 98/09 | 98/10 |
| Canned Anchovies | 200 | 175 | 192 | 138 | 170 | 149 | 154 | 190 | 202 | 174 |
| Canned Clams | 138 | 168 | 160 | 190 | 156 | 159 | 185 | 146 | 165 | 129 |
| Canned Oysters | 172 | 121 | 207 | 126 | 100 | 172 | 81 | 129 | 191 | 210 |
| Frozen Desserts | 1038 | 1241 | 963 | 1036 | 1194 | 936 | 1116 | 1271 | 999 | 1043 |
| Frozen Entrees | 515 | 523 | 493 | 562 | 498 | 521 | 509 | 483 | 657 | 498 |
| Fruit | 2630 | 2568 | 2422 | 2603 | 2325 | 2389 | 2175 | 2256 | 2662 | 2378 |
| Hardware | 516 | 500 | 524 | 517 | 558 | 479 | 483 | 488 | 417 | 436 |

SYSTEM AND METHOD FOR EXPLAINING EXCEPTIONS IN DATA

BACKGROUND OF THE INVENTION

1. Field of the Invention

The present invention relates generally to identifying and explaining exceptions in data to aid in data analysis.

2. Description of the Related Art

Multidimensional databases, particularly those having online analytical processing (OLAP), are used to analyze historical data for decision support. Multidimensional databases consist of two kinds of attributes: measures (numerical values such as sales volume) and dimensions (e.g., product name, store, time period, etc.). Each dimension in turn can include a hierarchy. For example, a hierarchy on the "product" dimension might be "specific product code", then "product type", then "product category".

It happens that to analyze data in a multidimensional database, an analyst might want to identify anomalies (referred to herein as "exceptions") in the data, because such exceptions can provide interesting information. As a simple example, sales of a particular product, such as oysters, might peak in a particular region at a particular time of year. Identifying such an exception can provide the analyst with useful insights on how to improve marketing, product display, and so on.

In OLAP databases, an analyst can interactively explore a multidimensional database to find regions of data exceptions using simple navigational operations, including drill-dowvn (to show more detail), roll-up (to show less detail), pivot (to change axis dimensions), and so on. In any case, the procedure is manual—an analyst might have to experiment, using trial and error, with many possible data displays, before finding interesting exceptions. The tediousness of this can be better appreciated with the understanding that a multidimensional database might include up to eight dimensions, each with a hierarchy of eight levels, with each level including perhaps hundreds of member data elements any one of which might be an exceptional element.

To address this shortcoming, the present inventors have provided a way to identify exceptions in [preferably "U.S. Pat. No. 6,094,651, issued Jul. 25, 2000"] [or less preferably "Sarawagi et al., "Discovery-Driven Exploration of OLAP Data Cubes", *Proc. of the 6th Int'l Conf. on Extending Database Technology (EDBT)*, 1998"], incorporated herein by reference. As disclosed therein, a model uses an equation that takes into account the effects and interactions of multiple dimensions and nestings of hierarchies to compute an anticipated value of a data element in the context of its position in the database, and the model combines trends along different dimensions to which the data element belongs to determine whether the element is exceptional.

As recognized by the present invention, it can be important to explain why an element is indicated as being exceptional so that the analyst more fully understands the presentation, particularly when more than two dimensions are being analyzed. More specifically, an analyst might be viewing, in a display showing first and second dimensions, a data element duly marked as being exceptional because of an anomalous value in a third dimension. The analyst would know that the data element is exceptional but because the dimensions being viewed are not those along which the anomalous value occurs, it would not be apparent to the analyst why the element is exceptional. As further understood herein, explaining the reason a data element is exceptional is not trivial because, as intimated above, the preferred model that is used for finding the exceptions in the first place involves one monolithic equation that combines the effects of multiple levels of data element aggregations along different dimensions. Fortunately, the present invention has considered the above-noted consequence and has provided the solution disclosed herein.

SUMMARY OF THE INVENTION

A computer is disclosed that is programmed to identify at least two dimensions for display of data exceptions therein. The logic embodies a method that includes providing an exception equation, and identifying at least two maximal terms in the equation. The method embodied by the logic also includes identifying at least two dimensions along which the maximal terms are aggregated, and displaying the data exceptions using the two dimensions.

In a preferred implementation, the exception equation identifies at least one exceptional element characterized by an actual residual that in turn is characterized by a difference from an anticipated value, with the difference defining a first direction. With this in mind, the logic includes generating a simple version of the exception equation using only the maximal terms.

As set forth in detail below, the logic further identifies sets of candidate maximal terms. Also, for each set of candidate maximal terms, the logic determines Whether the terms maintain an exceptional status of the exceptional element in the first direction, when the terms are used in the simple version of the exception equation. Moreover, the act of identifying at least two maximal terms can include, for each set of candidate maximal terms, determining a simple residual when the candidate maximal terms are used in the simple version of the exception equation. The selected set of maximal terms is identified as being the set of candidate maximal terms that both maintains an exceptional status of the exceptional element in the first direction when the terms are used in the simple version of the exception equation, and that results in a simple residual closest to the actual residual.

As intended herein, the selected set of maximal terms includes only two candidate maximal terms if the two maximal terms maintain an exceptional status of the exceptional element in the first direction when the terms are used in the simple version of the exception equation. Otherwise, the selected set can include more than two terms.

In another aspect, a general purpose computer includes logic that undertakes method acts for explaining exceptions in data having at least two dimensions. These method acts include providing an exception equation, and explaining exceptions in the data based on maximal coefficients in the equation. A computer program device embodying the present logic is also disclosed.

In still another aspect, a computer programmed with logic for identifying at least two dimensions for display of data exceptions therein undertakes a method that includes providing an exception equation for identifying at least one exceptional element in a first dimension in a database having multiple dimensions. The element is characterized by at least one residual that in turn is characterized by a difference from an anticipated value. At least two dimensions are ranked based on the difference between a residual of the exceptional element in each dimension and other residuals in that dimension. The exceptional element is presented in accordance with the ranking act.

In yet another aspect, a computer is programmed with logic for identifying at least two dimensions for display of data exceptions therein. An exception equation is provided for identifying at least one exceptional element in a first dimension in a database having multiple dimensions, with the element being characterized by at least one residual and with the residual being characterized by a difference from an anticipated value. The residual defines a sign. The computer then determines at least one largest magnitude coefficient in the equation having a sign opposite to the sign of the residual. The exceptional element is presented using the dimension associated with the coefficient in accordance with the determining act.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a screen display generated by the logic of the present invention; and

FIG. 5 is a screen display illustrating how the explanation for an otherwise exceptional data point can be masked without the benefit of the present invention.

DETAILED DESCRIPTION OF THE PREFERRED EMBODIMENTS

Figure 1:
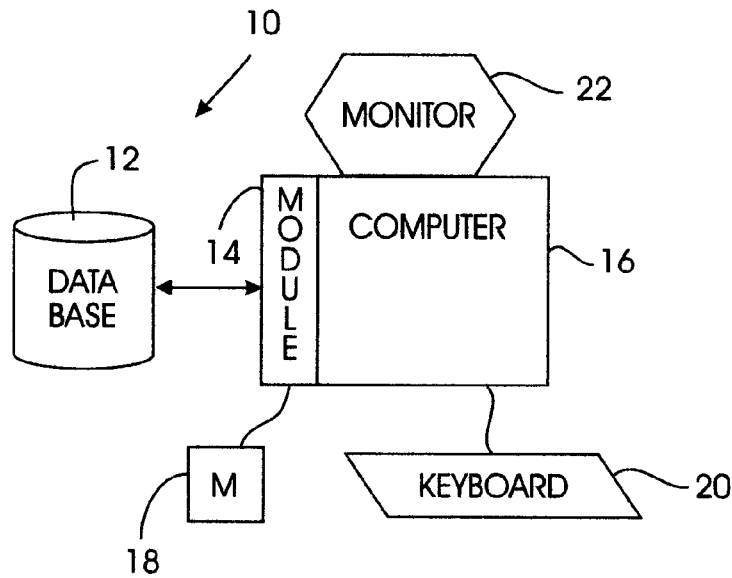
FIG. 1 is a block diagram of the architecture of the present system.

Referring initially to FIG. 1, a system is shown, generally designated 10, for exploring databases 12 that can be associated with wide area computer network components such as web sites via the Internet. As shown, the system 10 includes a softfware-implemented module 14 that is part of a computer 16 for communicating with a source of data records, such as the database 12. The source of the data can be a local database, a file system, table data from hypertext markup language pages, or indeed any source of attribute-value data records.

As disclosed in greater detail below, the module 14 receives user inputs from an input device, such as a mouse 18 or a keyboard 20. The module 14 embodies the present logic to display, on an output device such as a monitor 22, data from the database 12 in accordance with user input commands, with certain of the data elements being indicated and explained as being exceptional in accordance with the disclosure herein.

As intended herein, the computer 16 can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus. The input device can be established by one or more of: a computer mouse, keyboards, keypads, trackballs, and voice recognition devices. Output devices other than the monitor 22 can be used, such as printers, other computers or data storage devices, and computer networks.

In any case, the processor of the computer 16 accesses the module 14 to undertake the logic of the present invention, which may be executed by a processor as a series of computer-executable instructions. The instructions may be contained on a data storage device with a computer readable medium, such as a computer diskette having a computer usable medium with a program of instructions stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of C++ code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2:
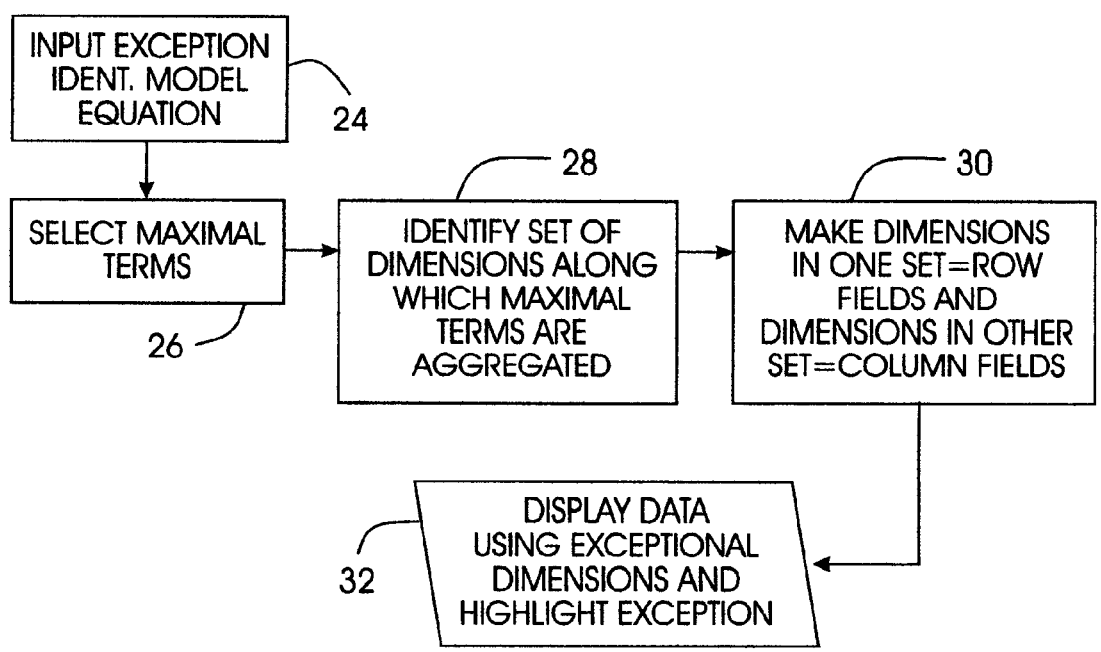
FIG. 2 is a flow chart of the overall logic.

Turning to FIG. 2, at block 24 an exception equation is input or otherwise received by the computer 16. The preferred exception equation is:

$$\log(y'_{i1,i2\ldots in}) = \text{sum over } G \subset \{d_1, d_2, \ldots d_n\}, \text{ of } \lambda^G_{(irdreG)},$$

where $y'_{i1,i2\ldots in}$ is the anticipated value of a value $y_{i1,i2\ldots in}$ in a multidimensional database (also referred to as a "cube") C at position $i_r$ of the $r^{th}$ dimension $d_r$ ($1 \leq r \leq n$), the $\lambda$ terms are the coefficients of the equation as determined by the above-referenced document, and the difference between the anticipated value and actual value is the residual.

In one simplified form of the above equation, for three dimensions A, B, and C, the equation might become:

$$\log(y_{ijk}) = \lambda + \lambda^A_i + \lambda^B_j + \lambda^C_k + \lambda^{AB}_{ij}$$

Proceeding to block 26 of FIG. 2, maximal terms are selected from the model equation as set forth further below in reference to FIG. 3. In accordance with the present invention, a term is maximal if no superset of the term exists in the equation. Using the simplified equation above as an example, the terms $\lambda^C_k + \lambda^{AB}_{ij}$ are the only two maximal terms.

Next moving to block 28, the set of dimensions along which the maximal terms are aggregated is identified. As set forth further below, preferably only two maximal terms (and, thus, two dimensions) are output, for ease of display, but if need be three or more maximal terms (and thus three or more dimensions) might be identified for display. When three or more dimensions are used, a three-dimensional display scheme can be used, with motion over time, or graphic element color, size, shape, etc. representing additional dimensions.

From block 28 the logic moves to block 30 to make the values of one dimension the row fields of a display and the other dimension's values the column fields. If one of the selected dimensions aggregates in more than one sub-dimension, the cross product of the sub-dimension can be used as, e.g., the row fields. The data is then output for, e.g., display on the monitor 22 at state 32 in FIG. 2, with the exceptional element(s) highlighted. With this in mind, it is to be appreciated that the reason for the exception is "explained" by way of outputting the data using the exceptional dimensions identified above. Alternatively, an actual explanation in the form of a sentence such as "the highlighted data is exceptional of its value in the $r^{th}$ dimension" can be output, or some other form of explanation can be provided.

Figure 3:
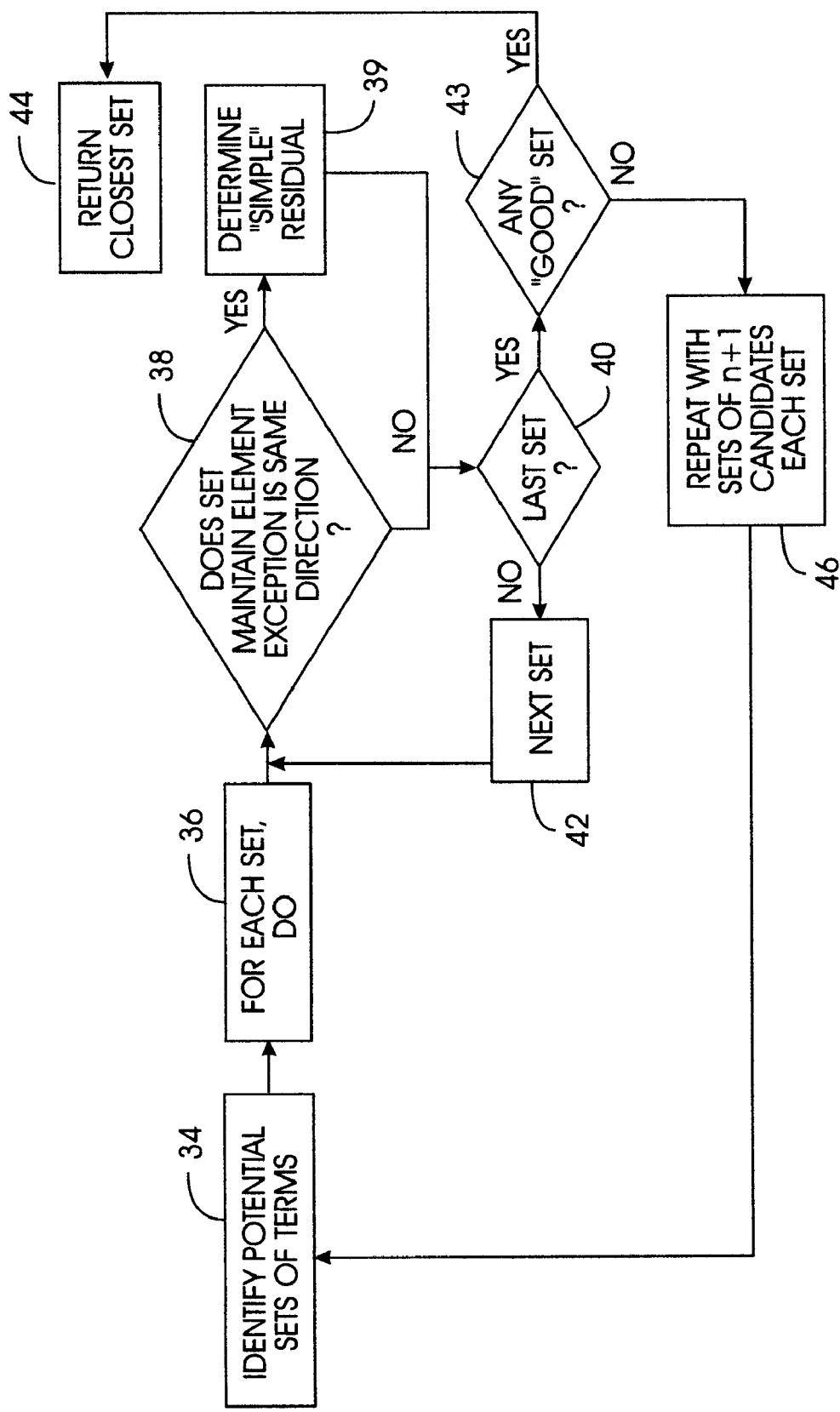
FIG. 3 is a flow chart of the logic for finding maximal terms.

The details of identifying maximal terms can be seen in FIG. 3. As mentioned above, it is preferable that only the two best dimensions are selected for display by way of "explaining" an exception, for simplicity of display, but if need be more than two dimensions can be selected. Accordingly, the process in FIG. 3 begins by identifying sets of potential maximal terms from the equation, with the sets consisting of "k" elements where k initially equals two.

Moving to block 36, a DO loop is entered for each set. Proceeding to decision diamond 38, it is determined whether, when only the candidate maximal terms are used in the exception equation (i.e., when the exception equation has been simplified to use only the candidate maximal terms), the element exception is maintained in the same direction it was in when the full model equation is used. By "same direction" is meant that the residual when the simplified equation is used is less than an expected value when the residual for the same element produced by the full equation is also less than the expected value, and, vice-versa, that the residual produced by the simplified equation for the element is greater than an expected value ashen the residual produced by the full equation is also greater than expected. Stated differently, the actual residual is characterized by a difference defining a first direction from an anticipated value produced by the full equation, and it is determined at decision diamond 38 whether the candidate terms maintain an exceptional status of an exceptional element in the first direction, when the terms are used in the simple version of the exception equation.

If the test at decision diamond 38 passes, the logic moves to block 39 to determine the residual produced when the candidate maximal terms are used in the simple equation. From block 39, or from decision diamond 38 if the test there fails, the logic moves to decision diamond 40 to determine whether the last set of candidate maximal terms has been used. If not, the next set is retrieved at block 42, and the process loops back to decision diamond 38 as shown. Otherwise, the logic moves from decision diamond 40 to decision diamond 43 to determine whether any "good" set has been identified, i.e., any set passing the directionality test at decision diamond 38. If at least one "good" set of maximal terms has been identified, the logic returns the candidate terms producing a simplified residual as determined at block 39 that is closest to the actual residual, i.e., the residual produced in the full model equation, at block 44 as the maximal terms. If no "good" set of "k" maximal terms has been identified, however, the logic moves to block 46 to increment by unit" the number "k" of candidate terms per set, and then the process repeats by looping back to block 34.

FIG. 4 illustrates a data display 50 produced by the present invention, and why the present invention is useful. A demonstration dataset of grocery sales data was used that has 250,000 entries with five primary category hierarchies of "store" (which includes "name", "country", and "state" sub categories), "customer", "product", "promotion", and "time period". Each category hierarchy has one or more levels.

Exceptions were identified, and with the present invention the display shown in FIG. 4 was produced by identifying, using maximal term analysis as set forth above, the dimensions of "country" and "time" along which sales totals were displayed. The second table of FIG. 4 shows the same data but expressed in terms of percentage of the row total.

As shown, the canned oyster sales total for Canada was exceptionally low in the period October/1998, amounting to only 1% of the 1988 Canadian sales total, and is clearly identified as a first exception 52 by highlighting, by way of explanation, in FIG. 4. Additionally, however, the preferred exception identification model equation identified U.S. sales in October/1998 as being exceptionally high and, thus, being a second exception 54, and this fact and the explanation for it is clearly seen in the 12% of total U.S. sales figure shown in FIG. 4. It is the only month for which U.S. sales amounted to a larger percentage of the total U.S. row sales than the sum of the row percentages for both Canada and Mexico. The data underlying the same exception could be displayed in a table of product category by time for U.S. sales as shown in FIG. 5, but in such a case the explanation for the exception—that sales in the U.S. were comparatively high, relative to Canada and Mexico—would have been masked, although the exception had indeed been calculated. Accordingly, it may now be appreciated that simply calculating an exception without identifying, by way of explaining the exception, the "best", most explanatory display dimensions, might not always result in a data display that usefully illustrates to an analyst exceptions in data.

Two alternate, less preferred ways to explain exceptions are now discussed. In the first, dimensions can be ranked based on how large a difference exists between the residual of an exceptional element in the dimension and the other residuals in the dimension (for fixed values in the other dimensions), with the dimension having the largest difference being displayed to indicate the exceptional element. In the second alternate approach, the largest and second-largest magnitude coefficients in the model equation that have signs opposite to the sign of the residual of the exceptional number are selected as the "maximal" terms for identifying dimensions to be displayed.

The above-described preferred embodiment can be implemented in a computationally efficient manner using a three-phase process. In the first phase, exceptions are computed in accordance with the above-referenced document as a sequence of aggregation and subtraction operations in one bottom-sweep of the data lattice. Summarizing for convenience of disclosure, assume a data cube with three dimensions A, B, and C. The process first aggregates along dimension C, such that the aggregate at AB can be subtracted from that at ABC. Next, the process aggregates along B to AC, and so on. At the end of each phase, each node (representing an aggregation) of the lattice stores the corresponding coefficient at that level. Then, in the second phase the exceptions found at detailed levels of the cube are summarized to higher aggregated levels using a second bottom-up sweep of the lattice, involving only the rows that have been identified as being exceptional. At the end of the second phase, the only remaining row s are those that are exceptional or that have child exceptional rows.

In the third phase, all coefficients of a row are locally collected top-down in the lattice. The search for the best set of maximal terms for each exceptional value is then executed as set forth above, using the following specific procedure in one preferred embodiment. For each term, the sum of all its subsets is added to it. For example, when the number "k" of candidate maximal terms per set is two, the terms $\lambda + \lambda^A_i + \lambda^B_j$ are added to the term $\lambda^{AB}_{ij}$ to obtain terms $\gamma^{AB}_{ij}$. Next, for each subset of candidate maximal terms $M_1$ and $M_2$, if, for example, $M_1$=AB and $M_2$=AC, the predicted value log($y_{ijk}$) is estimated as: $\gamma^{AB}_{ij} + \gamma^{AC}_{ik} - \gamma^A_i$. In this search, the possibility of a single maximal term is allowed by allowing the case where $M_2$ is empty. The best set of maximal terms is then determined using the logic described above in reference to FIG. 3.

As set forth above, when no set of two maximal terms is returned, the number "k" of maximal terms per set consequently is increased beyond two. In such a circumstance, the below generalized formula is applied to compute the predicted value $\log(y_{ijk})$:

$$M_1+M_2+\ldots+M_k-(M_{12}+\ldots+M_{(k-1)k})+(M_{123}+\ldots+M_{(k-2)(k-1)k})+(-)\ldots M_{12\ldots k},$$

where $M_{12}$ denotes intersection of the first two terms, $M_{123}$ denotes the intersection of the first three terms, and so on. For searching through the different combinations of maximal terms efficiently, the per row processing overhead can be minimized by initializing all the subset-superset relationships between each term of the equation in an array in memory. Thus, for each row, an array lookup can be performed to find the expected value for different subsets of terms.

While the particular SYSTEM AND METHOD FOR EXPLAINING EXCEPTIONS IN DATA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalent to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer programmed with logic for identifying at least two dimensions for display of data exceptions therein, the logic embodying method acts comprising:

providing an exception equation;

identifying at least two maximal terms in the equation;

identifying at least two dimensions along which each of the maximal terms is aggregated; and displaying the data exceptions using the two dimensions.

2. The computer of claim 1, wherein the exception equation identifies at least one exceptional element, the element being characterized by an actual residual, the actual residual being characterized by a difference from an anticipated value, the difference defining a first direction, and wherein the act undertaken by the logic of identifying at least two maximal terms includes:

using only the maximal terms, generating a simple version of the exception equation.

3. The computer of claim 2, wherein the method undertaken by the logic further comprising:

identifying sets of candidate maximal terms; and for each set of candidate maximal terms, determining whether the terms maintain an exceptional status of the exceptional element in the first direction, when the terms are used in the simple version of the exception equation.

4. The computer of claim 3, wherein the act of identifying at least to maximal terms further includes:

for each set of candidate maximal terms, determining a simple residual characterizing a difference when the candidate maximal terms are used in the simple version of the exception equation; and identifying as the selected set of maximal terms the set of candidate maximal terms that both maintains an exceptional status of the exceptional element in the first direction when the terms are used in the simple version of the exception equation, and that results in a simple residual closest to the actual residual.

5. The computer of claim 4, wherein the selected set of maximal terms includes only two candidate maximal terms if the two maximal terms maintain an exceptional status of the exceptional element in the first direction when the terms are used in the simple version of the exception equation.

6. A computer program product including a program of instructions having:

computer readable code means for providing an exception equation;

computer readable code means for identifying at least two maximal terms in the equation;

computer readable code means for identifying at least two dimensions along which each of the maximal terms is aggregated; and computer readable code means for displaying the data exceptions using the two dimensions.

7. The computer program product of claim 6, wherein the exception equation identifies at least one exceptional element, the element being characterized by an actual residual, the actual residual being characterized by a difference from an anticipated value, the difference defining a first direction, and wherein the product further comprises:

computer readable code means for, using only the maximal terms, generating a simple version of the exception equation.

8. The computer program product of claim 7, further comprising:

computer readable code means for identifying sets of candidate maximal terms; and computer readable code means for, for each set of candidate maximal terms, determining whether the terms maintain an exceptional status of the exceptional element in the first direction, when the terms are used in the simple version of the exception equation.

9. The computer program product of claim 8, further comprising:

computer readable code means for, for each set of candidate maximal terms, determining a simple residual characterizing a difference when the candidate maximal terms are used in the simple version of the exception equation; and computer readable code means for identifying as the selected set of maximal terms the set of candidate maximal terms that both maintains an exceptional status of the exceptional element in the first direction when the terms are used in the simple version of the exception equation, and that results in a simple residual closest to the actual residual.

10. The computer program product of claim 9, wherein the selected set of maximal terms includes only two candidate maximal terms if the two maximal terms maintain an exceptional status of the exceptional element in the first direction when the terms are used in the simple version of the exception equation.

11. A computer programmed with logic for identifying at least two dimensions for display of data exceptions therein, the logic embodying method acts comprising:

providing an exception equation for identifying at least one exceptional element in a first dimension in a database having multiple dimensions, the element being characterized by at least one residual characterized by a difference from an anticipated value, the residual defining a sign;

determining at least one largest magnitude coefficient in the equation having a sign opposite to the sign of the residual, the coefficient being associated with a dimension; and presenting the exceptional element using the dimension in accordance with the determining act.

12. A computer programmed with logic for identifying at least two dimensions for display of data exceptions therein, the logic embodying method acts comprising:

providing an exception equation for identifying at least one exceptional element in a first dimension in a database having multiple dimensions, the element being characterized by at least one residual characterized by a difference from an anticipated value;

ranking at least two dimensions based on the difference between a residual of the exceptional element in each dimension and other residuals in the respective dimension; and presenting the exceptional element in accordance with the ranking act.

* * * * *